Aug. 1, 1933.   F. W. KULICKE ET AL   1,920,511
SAFETY GAS COCK
Filed Feb. 26, 1931
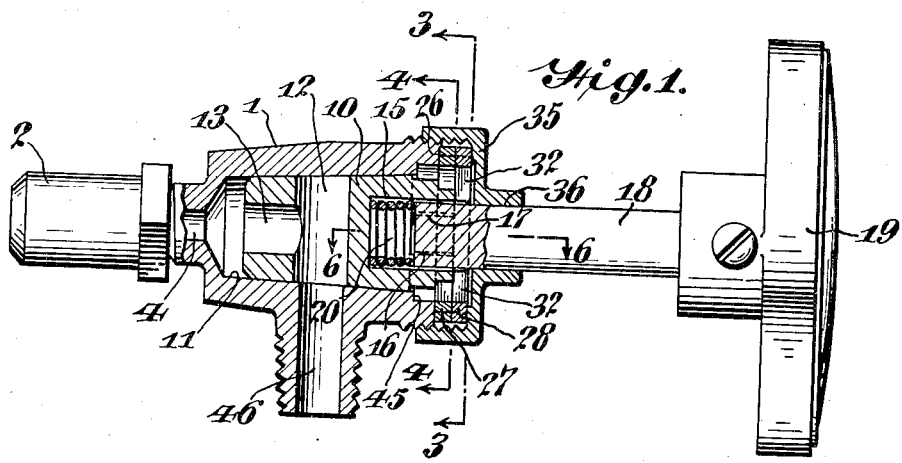
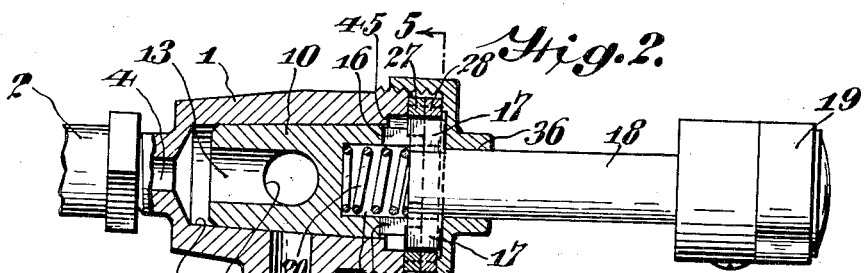
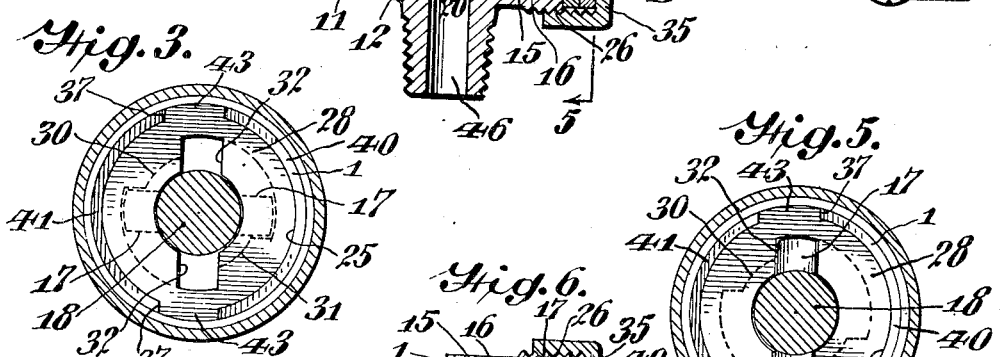
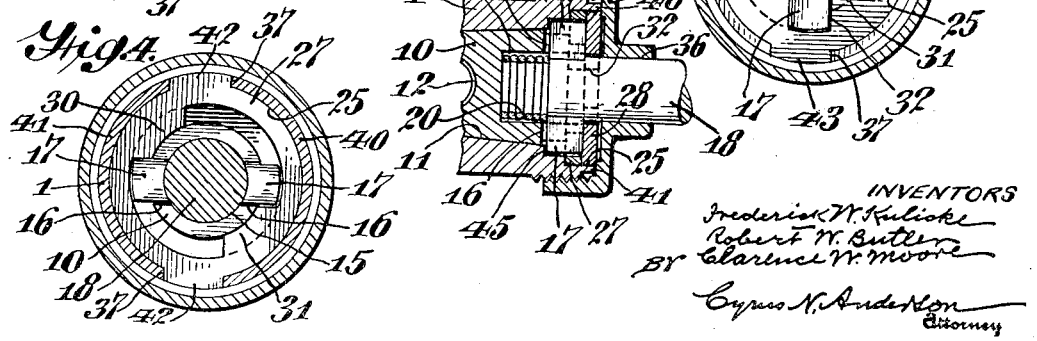
INVENTORS
Frederick W. Kulicke
Robert W. Butler
BY Clarence W. Moore
Cyrus N. Anderson
Attorney Patented Aug. 1, 1933

1,920,511

UNITED STATES PATENT OFFICE 1,920,511

SAFETY GAS COCK

Frederick W. Kulicke and Robert W. Butler, Philadelphia, and Clarence W. Moore, Roslyn, Pa., assignors to Mitchell Specialty Company, Philadelphia, Pa., a Corporation of Pennsylvania Application February 26, 1931. Serial No. 518,378

10 Claims. (Cl. 251—165)

Our invention relates to safety gas cocks and it has for its object to provide a construction including novel means which when the cock or valve is in closed position will operate to prevent turning of the same into open position until after movement axially in one direction or the other of the device for turning the said valve. In the construction as illustrated the necessary preaxial movement to be given to the handle before it can be turned to open the valve is inward.

It also is an object of the invention to provide a gas cock having means whereby the valve is prevented from becoming jammed into the recess or opening within which it is seated.

A further object of the invention is to provide a plurality of flat ring-like members mounted in one end of the valve casing for regulating and controlling the turning movements of the valve, one of which members is provided with means for limiting and controlling the extent of movement of the valve.

Another object of the invention is to provide means whereby the said ring-like members necessarily must be placed within an open end of the valve casing in proper relation to each other and to the valve to so limit the movements of the means for turning said valve that the latter when turned will be stopped in either an open or a closed position, as may be desired.

Other objects and advantages of our invention will be pointed out in the detailed description thereof which follows or else will become apparent from such description.

In order that the invention may be readily understood and its practical advantages fully appreciated reference should be had to the accompanying drawing wherein we have illustrated one embodiment of our invention in a mechanical form at present preferred by us but it will be understood that the invention is susceptible of embodiment in other forms of construction than that shown and that changes in the details of construction may be made within the scope of the claims without departing from our invention.

In the drawing:

Fig. 1 is a view in central longitudinal section of a gas cock or valve embodying the invention, the handle for operating the valve and the gas discharge nipple leading from the valve casing being shown in elevation;

Fig. 2 is a similar view showing the handle and the valve plug in positions substantially at right angles from the positions in which they are shown in Fig. 1;

Fig. 3 is a transverse sectional view taken on the line 3—3 of Fig. 1;

Fig. 4 is a similar view taken on the line 4—4 of Fig. 1;

Fig. 5 is a transverse sectional view taken on the line 5—5 of Fig. 2; and

Fig. 6 is a central longitudinal sectional view of a fragmentary portion of the valve structure taken in a plane substantially at right angles to that in which Figs. 1 and 2 are taken, with the valve turning means in the position in which it is shown in Fig. 1.

In the drawing we have shown at 1 the valve casing of the gas valve or cock from which projects the nipple 2. An opening 4 extends from the chamber of the valve casing 1 through the nipple 2 through which gas is discharged from the valve casing to a burner, not shown. The rotatably movable valve member consists of a plug 10, preferably tapered and fitting within a tapered chamber 11. The said plug is provided with an opening 12 extending transversely therethrough and an opening 13 extending lengthwise thereof, one end of the latter opening terminating upon the inner end of the said plug while the opposite end thereof terminates in the crosswise extending opening 12. While the opening 12 is shown as extending entirely through the plug 10 it will be understood that this need not be the case.

The outer end of the plug is provided with a relatively deep recess 15. The outer edge of the plug surrounding the recess 15 is provided with notches 16 within which the opposite extending projections 17 upon the inner end of the valve actuating member 18, consisting of a short rod section, are located. For the purpose of manipulating the valve actuating member 18 we have provided a finger piece or handle 19 upon the outer end thereof. As stated, the projections 17 are located within the notches 16 provided in the outer end of the valve plug 10. A coiled spring 20 is mounted within the recess 15. The outer end of said spring bears against the inner end of the valve plug actuating member 18 and tends to hold the latter outwardly. In other words, the spring 20 is compressed by the engagement of the outer end thereof by the inner end of the member 18, in consequence of which the said member 18 is subjected continuously to a force exerted outwardly thereon by the tendency of the said spring to expand.

The front open end of the valve casing 1 is provided upon its inner side with a cut out or rabbeted portion 25 the presence of which provides a shoulder 26. Flat plate or ring-like members 27 and 28 are mounted within the enlarged opening at the front end of the casing 1, the internal diameter of the latter being less than that of the former. The ring-like member 27 is seated against the shoulder 26 while the ring-like member 28 is seated against or in contact with the outer side of the member 27. The outer surface of the ring-like member 28 is flush with the outer edge of the front end of the casing 1. The inner edge of the ring-like member 27 is provided with oppositely disposed inwardly projecting stops 30 and 31. When the valve plug 10 is in open position the projections 17 upon the inner end of the valve actuating member 18 occupy the positions with respect to the projecting stops 30 and 31, as best indicated in Figs. 3 and 4 of the drawing. In order to close the valve the valve actuating member is turned to the left or in a counter-clockwise direction so that the projections 17 are turned into the positions with respect to the stop projections 30 and 31 as shown in Fig. 5 of the drawing. When in the former position; that is, the position as shown in Figs. 1, 3 and 4, the projections 17 are located underneath the inner edge portions of the ring-like member 28 and are pressed against the under side thereof by the expanding tendency of the coiled spring 20, the said spring at such time being under greater compression than when the valve is in closed position. This condition is best shown in Figs. 1 and 6 of the drawing. When in such position the valve plug 10 may be turned from open into closed position merely by applying or exerting through the finger piece or handle 19 a force to rotate the valve actuating member 18 to thereby rotate the valve plug from open into closed position. When in closed position, as in Figs. 2 and 5, the projections 17 are in alinement with slots or notches 32 provided in the inner edge of the ring-like member 28 in opposed relation to each other. When in such position the spring 20 expands, as shown in Fig. 2, and pushes the valve actuating member outwardly and causes the projections 17 to occupy positions within the notches 32. When in such position it is impossible to rotate the member 18 to cause rotation of the valve plug 10 from closed into open position without first pushing the said member inwardly in opposition to the force exerted by the spring 20 to move the projections 17 inwardly so that their outer edges are located in a plane inwardly of or at least flush with the plane of the inner surface of the ring member 28. When the projections have been moved into that position the member 18 may be rotated toward the right to cause corresponding rotation of the valve plug 10 to turn the same into open position. The contact of the projections 17 with the stops 30 and 31, as indicated in Figs. 3 and 4, limits the rotative movement of the member 18 and of the valve plug 10 actuated thereby. When the projections 17 occupy the positions as illustrated in Fig. 5, at which time they are located in the notches or slots 32, the outer sides thereof contact with the inner side of a cap 35 having screw-threaded connection with the outer or front end of the casing 1. The valve actuating member 18 projects through a central opening 36 provided in the said cap.

In order to insure that the ring member 27 shall be placed within the front open end of the casing 1 in position to properly locate the stop projections 30 and 31 with respect to the transverse opening 12 through the valve plug 10 we have provided notches 37 in the outer or front edge of the said casing which are located asymmetrically with respect to a diametral line of the front end of the casing extending in parallel relation to the side walls of the notches 32 provided in the ring member 28 when the latter is in position as shown in Fig. 3. As will be apparent, the segmental portion 40 of the front edge of the casing on one side of the said notches is of greater length than the other segmental portion 41. That is an indication of the asymmetrical position of the notches 37. To further insure that the ring member 27 shall be placed in proper position as indicated the surfaces of the edges of one of the notches 37 are located in planes which extend in slightly angular relation to the planes of the surfaces of the edges of the other of said notches. The projections 42 upon the outer edge of the ring-like member 27 are positioned thereon to correspond with the positions of the notches 37 and the surfaces of the opposite edges thereof are formed to correspond with the surfaces of the inner edges of the said notches. In consequence of the positions of the said notches and of the said projections and of the relation of the surfaces upon the opposite edges of the projections and the surfaces of the edges of the notches it is impossible to insert the ring-like member 27 into the open end of the casing 1 unless it be in such relation to the said opening that the stop projections 30 and 31 will be properly related to the transverse opening 12 in the valve plug 10. The projections 43 from the outer edge of the ring-like member 28 are in all respects similar to the projections 42 upon the member 27.

In order to prevent the inner end of the valve actuating member 18 from contacting with the valve plug 10 to push the latter inwardly when the said member is pushed inwardly as previously described we have provided a shoulder 45 upon the inner side of the opening of the valve casing near the front end thereof with which the outer ends of the projections 17 contact when they are pushed inwardly. But for this or some equivalent means for limiting the inward movement of the member 18 with respect to the valve plug 10 the latter would be liable to be pushed inwardly upon its seat and become jammed or locked and rotation thereof thereby rendered difficult if not impossible for practical purposes.

The gas is admitted to the gas cock or valve through an opening 46 which is common to constructions of the character to which the invention relates.

It will be seen that by our invention we have provided an extremely simple construction of means to prevent accidental opening of a gas cock or valve after the same once has been closed; also that we have provided means to insure that the valve plug may be rotated into two stopped positions only in one of which the valve is open and in the other of which it is closed; and also that we have provided means for preventing jamming or locking of the valve plug in its seat and thereby preventing rotation thereof practically or without difficulty.

Having thus described our invention, what we claim and desire to secure by Letters Patent is:

1. In a safety gas cock the combination of a casing having an opening therein the front end of which is enlarged, a rotatable valve plug located in said opening the front end of which projects into the enlarged portion of said opening, the said valve plug having a recess in its front end and notches in the edges of the portion of the plug surrounding said recess, and ring-like members mounted one upon the other in the enlarged portion of the opening in said casing, the inner diameter of the inner of said ring-like members being greater than that of the outer of said members, the inner member being provided with stop projections upon the inner edge thereof and the outer of said members having notches in the inner edge thereof in opposed relation to each other.

2. In a safety gas cock the combination of a valve casing having an opening therein the front end of which is enlarged, a rotatable valve plug located in the said casing with its front end projecting into the enlarged portion of said opening, the front end of said plug being provided with a recess and the edges of the walls surrounding said recess being provided with oppositely disposed notches, a spring located in said recess, a member extending into said recess and having projections in engagement with the said notches for turning the said valve plug, and ring-like members mounted in the enlarged portion of the opening at the front end of said casing, the internal diameter of the inner of said ring-like members being greater than the internal diameter of the outer of said ring-like members, the outer of said ring-like members having notches to receive the said projections when the said valve turning member is moved outwardly under the influence of the said spring and the diameter of the inner of said ring-like members being of a length to permit rotation of the said projections when they occupy positions in the plane of the said inner ring-like member.

3. In a safety gas cock the combination of a valve casing having an opening therein the outer end of which is enlarged, a rotatable valve plug mounted in said opening to open and close a passageway extending through the said valve casing, the outer end of said valve plug being provided with a recess the surrounding walls of which are provided with notches extending lengthwise of the said valve plug, a member which extends into the said recess, said member having projections at its inner end which engage the said notches, ring-like members mounted in the enlarged opening at the front end of the said valve casing, one of said members overlying the other, the internal diameter of the inner of said ring-like members being greater than that of the outer ring-like member, the diameter of the inner member being sufficient to permit rotation of the said projections when they occupy positions in the plane of said inner ring-like member and the said inner ring-like member having projections upon its inner edge in opposed relation to each other to limit the rotary movements of the said valve turning member, the outer of said ring-like members being provided with notches in the inner edge thereof, and a spring mounted in the said recess and operating to move the valve turning member to cause the said projections to enter the notches in the outer of said ring-like members when the said projections occupy positions underneath and in alinement with the said notches.

4. In a safety gas cock the combination of a valve casing having an opening therein the outer end of which is enlarged, a rotatable valve plug mounted in said opening to open and close a passageway extending through the said valve casing, the outer end of said valve plug being provided with a recess the surrounding walls of which are provided with notches extending lengthwise of the said valve plug, a member which extends into the said recess, said member having projections at its inner end which engage the said notches, ring-like members mounted in the enlarged opening at the front end of the said valve casing, one of said members overlying the other, the internal diameter of the inner of said ring-like members being greater than that of the outer ring-like member, the diameter of the inner member being sufficient to permit rotation of the said projections when they occupy positions in the plane of said inner ring-like member and the said inner ring-like member having projections upon its inner edge in opposed relation to each other to limit the rotary movements of the said valve turning member, the outer of said ring-like members being provided with notches in the inner edge thereof, a spring mounted in the said recess and operating to move the valve turning member to cause the said projections to enter the notches in the outer of said ring-like members when the said projections occupy positions underneath and in alinement with the said notches, and means for retaining the said ring-like members and the said valve turning member within the enlarged opening at the outer end of the said valve casing.

5. In a safety gas cock the combination of a valve casing having an opening therein the front end of which is enlarged, a rotatable valve plug mounted in said opening and adapted to open and close a passageway for gas extending through said valve casing, the said valve plug having a recess extending axially thereof in its front end, the surrounding walls of said recess having notches therein, a coiled spring mounted in said recess, a member extending into said recess engaging at its inner end the coiled spring and being pushed outwardly by the latter, the said member having projections extending laterally from its inner end, which projections engage the said notches for turning the said valve plug, ring-like members mounted in the outer part of the enlarged portion of said opening, the said ring-like members being in overlying relation to each other, the internal diameter of the inner ring-like member being greater than that of the outer ring-like member, the inner edge of the inner ring-like member having inwardly extending projections and the inner edge of the outer ring-like member having notches therein in opposed relation to each other, the projections upon the said valve turning member being rotatable within the inner ring-like member when they occupy positions in the plane thereof, the said projections occupying the positions underneath the inner edge portion of the outer ring-like member when the said valve plug has been turned into open position and being engaged thereby to prevent outward movement thereof and the said projections occupying positions in alinement with the notches in the inner edge of the outer ring-like member when the valve plug occupies its closed position, and means for preventing rotation of the said ring-like members whereby when the said projections occupy positions in the notches of the said outer ring-like member rotation thereof and of the valve plug is prevented until after the said projections are moved inwardly into the plane of the inner ring-like member.

6. In a safety gas cock the combination of a valve casing having an opening therein the front end of which is enlarged, the inner portion of said enlargement being of less diameter than the outer portion thereof to provide a couple of shoulders therein, a rotatable valve plug located in the said opening having a recess in its front end, the wall portions of said valve plug surrounding said recess being provided with notches, a member extending into the said recess having laterally extending projections upon its inner end for engaging the said notches to turn the said valve plug into open and closed positions, and a coiled spring located in the said recess which engages the inner end of said valve turning member and tends to hold it in its outermost position, ring-like members located near the outer larger part of the said openings, the internal diameter of the inner ring-like member being greater than that of the outer ring-like member, the latter having notches in its inner edge into which the said projections are adapted to be moved by the action of said spring when the said projections are moved into positions in alinement therewith, the inner of the said shoulders engaging the outer ends of the said projections to limit the inward movement of the said valve turning member to prevent jamming of the said valve plug when the said valve turning member is pushed inwardly to cause movement of the said projections out of the notches in the inner edge of the said ring-like member into the plane of the inner of said ring-like members.

7. In a safety gas cock the combination of a valve casing having an opening therein the outer portion of which is enlarged, a rotatable valve plug located in the said opening, said valve plug having a recess in its outer end extending axially thereof, the front edge portion of the surrounding wall of said recess being provided with notches, an expansible spring located in said recess, a member extending into said recess and engaging the outer end of said spring, said member having laterally extending projections which are located in the said notches, ring-like members located in the enlarged portion of the opening at the front end of the said casing, the internal diameter of the inner ring-like member being greater than that of the outer ring-like member, the inner edge of the inner member having stop projections located in position to engage the said projections and stop the rotation of the valve plug in either open or closed position and the inner edge of the outer ring-like member having notches therein into which the said projections are adapted to be moved when the said valve plug is stopped in closed position by the action of the said spring, and means to limit inward movement of the said valve turning member when it is pushed inwardly to disengage the said projections from the notches in the inner edge of the said outer ring-like member.

8. In a safety gas cock the combination of a valve casing having an opening therein the outer portion of which is enlarged, a rotatable valve plug located in the said opening, said valve plug having a recess in its outer end extending axially thereof, the front edge portion of the surrounding wall of said recess being provided with notches, an expansible spring located in said recess, a member extending into said recess and engaging the outer end of said spring, said member having laterally extending projections which are located in the said notches, ring-like members located in the enlarged portion of the opening at the front end of the said casing, the internal diameter of the inner ring-like member being greater than that of the outer ring-like member, the inner edge of the inner member having stop projections located in position to engage the said projections and stop the rotation of the valve plug in either open or closed position and the inner edge of the outer ring-like member having notches therein into which the said projections are adapted to be moved when the said valve plug is stopped in closed position by the action of the said spring, means to limit inward movement of the said valve turning member when it is pushed inwardly to disengage the said projections from the notches in the inner edge of the said outer ring-like member, and means for engaging the said projections when they are moved into the notches in the said outer ring-like member for preventing removal of the said valve turning member.

9. In a safety gas cock the combination of a valve casing, a rotatable valve mounted therein for opening and closing a passageway through said casing, means extending into the front end of said casing and engaging the said rotatable valve for turning the same into open and closed positions, a pair of oppositely arranged projections on the valve turning means, a plate removably and nonrotatably mounted in the casing and having a pair of oppositely arranged slots therein to receive said projections, a second plate removably and nonrotatably mounted inwardly thereof and having stops thereon for said projections to limit rotatable movement of said valve turning means, and means for retaining the said plates in said casing.

10. In a safety gas cock, the combination of an open-ended valve casing, a plug rotatably mounted therein, a plug actuating member longitudinally movable with respect to the plug, means for limiting rotational movement of the plug comprising a plate mounted in the open end of the casing and having stop means thereon cooperating with stop means on the plug actuating member, means for locking the plug against rotation when the plug actuating member is in its outermost position, comprising a plate overlying the first mentioned plate and having openings therein to receive the stop means on the plug actuating member, means to prevent rotation of said plates with respect to said valve casing, and means for retaining the plates within the casing.

FREDERICK W. KULICKE.
ROBERT W. BUTLER.
CLARENCE W. MOORE.